(12) United States Patent
Shimizu et al.

(10) Patent No.: US 11,394,210 B2
(45) Date of Patent: Jul. 19, 2022

(54) CHARGING SYSTEM

(71) Applicant: DENSO CORPORATION, Kariya (JP)

(72) Inventors: Hiroshi Shimizu, Nisshin (JP); Ryuji Omata, Kariya (JP); Daigo Nobe, Toyota (JP); Makoto Nakamura, Okazaki (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 16/709,967

(22) Filed: Dec. 11, 2019

(65) Prior Publication Data

US 2020/0185953 A1 Jun. 11, 2020

(30) Foreign Application Priority Data

Dec. 11, 2018 (JP) .............................. JP2018-231973

(51) Int. Cl.
*H02J 7/00* (2006.01)
*H02J 7/04* (2006.01)
*H02M 7/5387* (2007.01)
*B60L 53/20* (2019.01)
(Continued)

(52) U.S. Cl.
CPC ............ *H02J 7/0013* (2013.01); *B60L 53/20* (2019.02); *B60L 53/53* (2019.02); *H02J 7/04* (2013.01); *H02J 7/14* (2013.01); *H02M 7/5387* (2013.01); *B60L 2210/42* (2013.01); *B60L 2220/10* (2013.01)

(58) Field of Classification Search
CPC ........ H02J 7/0013; H02J 7/04; H02M 7/5387; B60L 2210/42; B60L 2220/10; B60L 53/11; B60L 53/20; Y02T 10/70; Y02T 10/7072; Y02T 90/12
See application file for complete search history.

(56) References Cited

U.S. PATENT DOCUMENTS

| 2016/0006276 A1* | 1/2016 | Mikulec | ............. H01M 10/441 307/19 |
| 2016/0152128 A1* | 6/2016 | Minegishi | ............ B60L 15/007 180/65.265 |
| 2017/0346334 A1* | 11/2017 | Mergener | .................. H02J 9/06 |

(Continued)

FOREIGN PATENT DOCUMENTS

| DE | 102014201225 A1 * | 7/2015 | ............ H02J 7/0016 |
| EP | 3628531 A1 * | 4/2020 | ............. B60L 50/51 |

(Continued)

*Primary Examiner* — Naum Levin
(74) *Attorney, Agent, or Firm* — Oliff PLC

(57) ABSTRACT

A charging system charges, through an external charger, a first voltage source and a second voltage source that supply electric power to a rotating electric machine that includes coils of phases. A first inverter is connected to respective first ends of the coils and the first voltage source. A second inverter is connected to respective second ends of the coils and the second voltage source. A first switch is provided on a first power supply line that connects a high potential side of the first voltage source and a first external connection terminal that is connected to a high potential side of the external charger. A second switch is provided on a second power supply line that connects a low potential side of the second voltage source and a second external connection terminal that is connected to a low potential side of the external charger.

11 Claims, 11 Drawing Sheets

(51) Int. Cl.
*B60L 53/53* (2019.01)
*H02J 7/14* (2006.01)

(56) References Cited

U.S. PATENT DOCUMENTS

| | | | |
|---|---|---|---|
| 2020/0161878 A1* | 5/2020 | Niimi | B60L 58/21 |
| 2020/0195032 A1* | 6/2020 | Shimizu | H02J 7/0068 |

FOREIGN PATENT DOCUMENTS

| | | | | |
|---|---|---|---|---|
| FR | 3049408 A1 * | 9/2017 | | H02J 7/14 |
| JP | H09-215216 A | 8/1997 | | |
| JP | 2004-120857 A | 4/2004 | | |
| JP | 2009-131077 A | 6/2009 | | |
| JP | 2009-254063 A | 10/2009 | | |
| JP | 2011-010429 A | 1/2011 | | |
| JP | 2012223053 A * | 11/2012 | | |
| JP | 2013-081316 A | 5/2013 | | |
| JP | 2013223410 A * | 10/2013 | | |
| JP | 2016-063702 A | 4/2016 | | |
| JP | 2016181948 A * | 10/2016 | | |
| JP | 2020005394 A * | 1/2020 | | |
| JP | 2020096520 A | 6/2020 | | |

\* cited by examiner (PARALLEL CHARGING OF VOLTAGE SOURCES 1 AND 2)

(SERIAL CHARGING OF VOLTAGE SOURCES 1 AND 2)

(INDIVIDUAL CHARGING OF VOLTAGE SOURCE 1)

(INDIVIDUAL CHARGING OF VOLTAGE SOURCE 2)

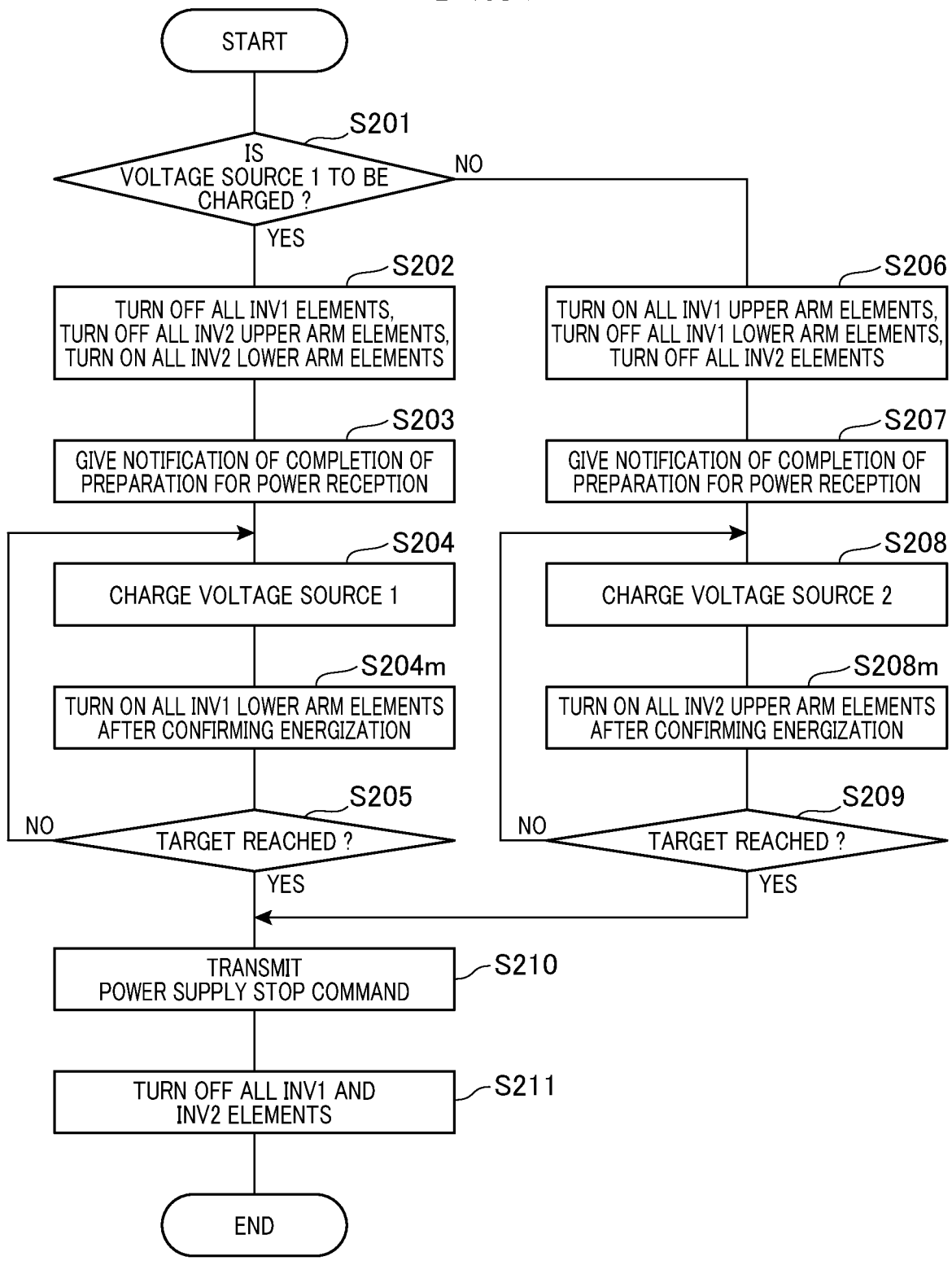

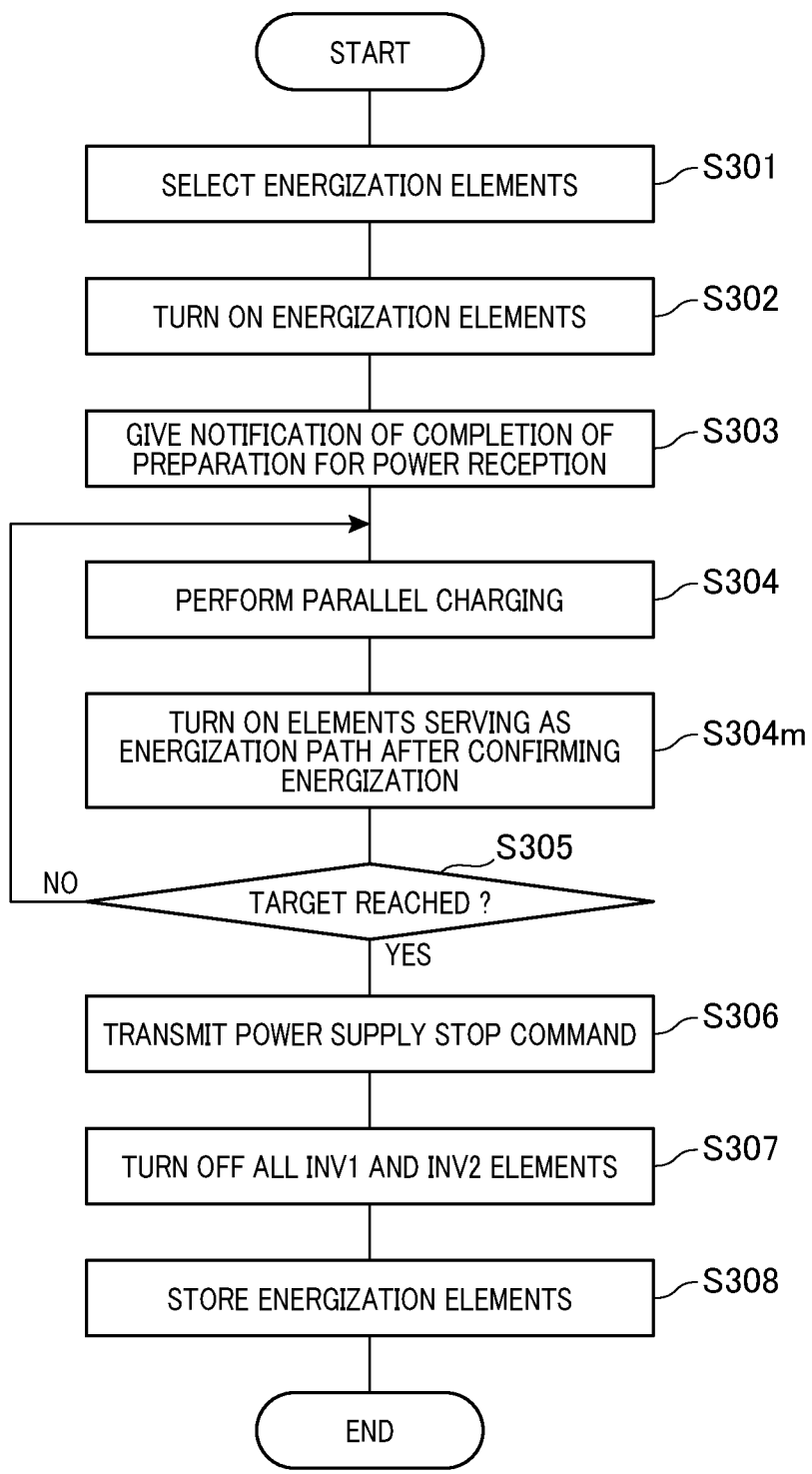

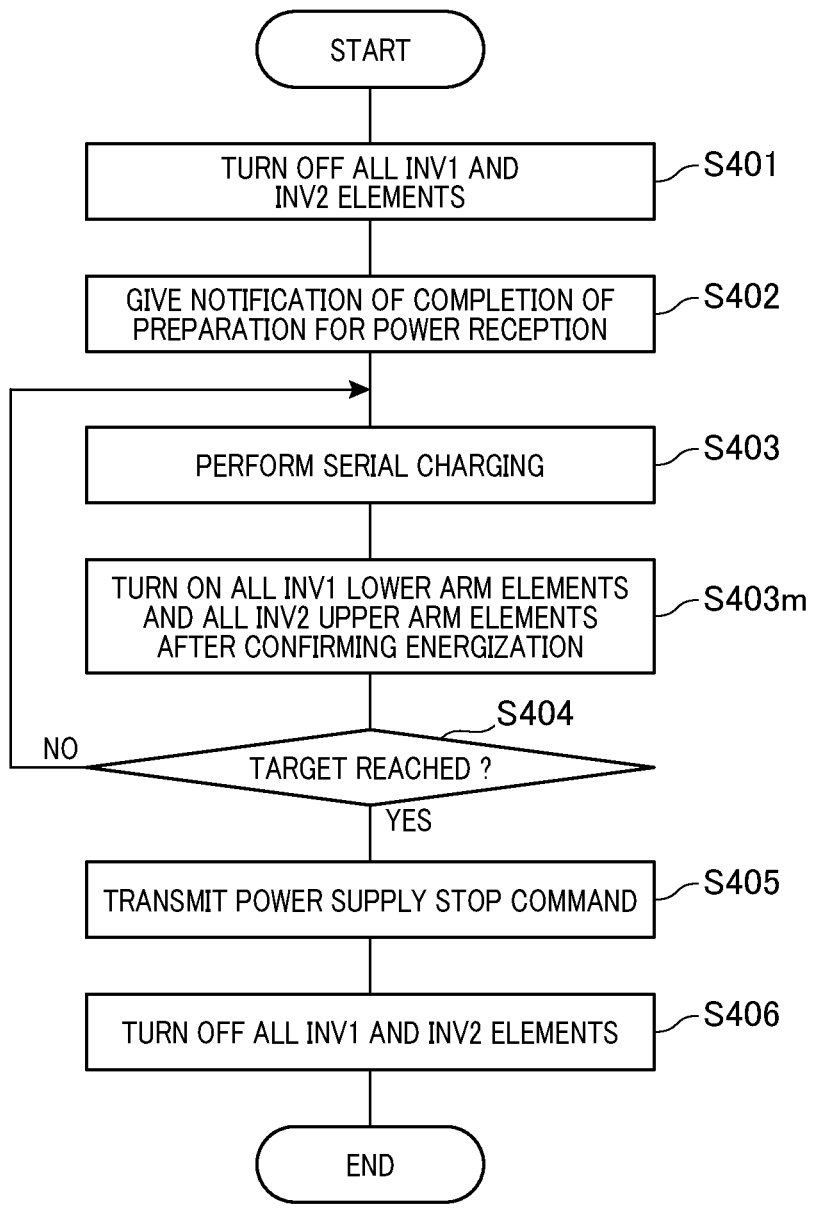

(ENERGIZATION ELEMENTS DURING PREVIOUS CHARGING)

(ENERGIZATION ELEMENTS DURING CURRENT CHARGING)

CHARGING SYSTEM

CROSS-REFERENCE OF RELATED APPLICATIONS

This application is based on and claims the benefit of priority from Japanese Patent Application No. 2018-231973, filed on Dec. 11, 2018, the description of which is incorporated herein by reference.

BACKGROUND

Technical Field

The present disclosure relates to a charging system.

Related Art

A known system drives an alternating-current electric motor that has open-end windings of multiple phases with separated neutral points. For example, this system includes a first inverter and a second inverter. The first inverter includes a first switch that is connected to first ends of the windings of the alternating-current electric motor. The second inverter includes a second switch that is connected to second ends of the windings of the alternating-current electric motor.

SUMMARY

The present disclosure provides a charging system that charges, through an external charger, a first voltage source and a second voltage source that are two voltage sources that supply electric power to a rotating electric machine that includes multiphase coils. The charging system includes a first inverter, a second inverter, a first switch, and a second switch. The first inverter includes a plurality of first switching elements that correspond to the multiphase coils. The first inverter is connected to respective first ends of the coils and the first voltage source. The second inverter includes a plurality of second switching elements that correspond to the multiphase coils. The second inverter is connected to respective second ends of the coils and the second voltage source. The first switch is provided on a first power supply line that connects a high potential side of the first voltage source and a first external connection terminal that is connected to a high potential side of the external charger. The second switch is provided on a second power supply line that connects a low potential side of the second voltage source and a second external connection terminal that is connected to a low potential side of the external charger. The charging system controls on/off switching of the plurality of first switching elements and the plurality of second switching elements.

BRIEF DESCRIPTION OF THE DRAWINGS

In the accompanying drawings:

FIG. 8 is a flowchart of an individual charging mode in the charging system according to the embodiment;

FIG. 9 is a flowchart of a parallel charging mode in the charging system according to the embodiment;

FIG. 10 is a flowchart of a serial charging mode in the charging system according to the embodiment.

DESCRIPTION OF THE EMBODIMENTS

Figure 1:
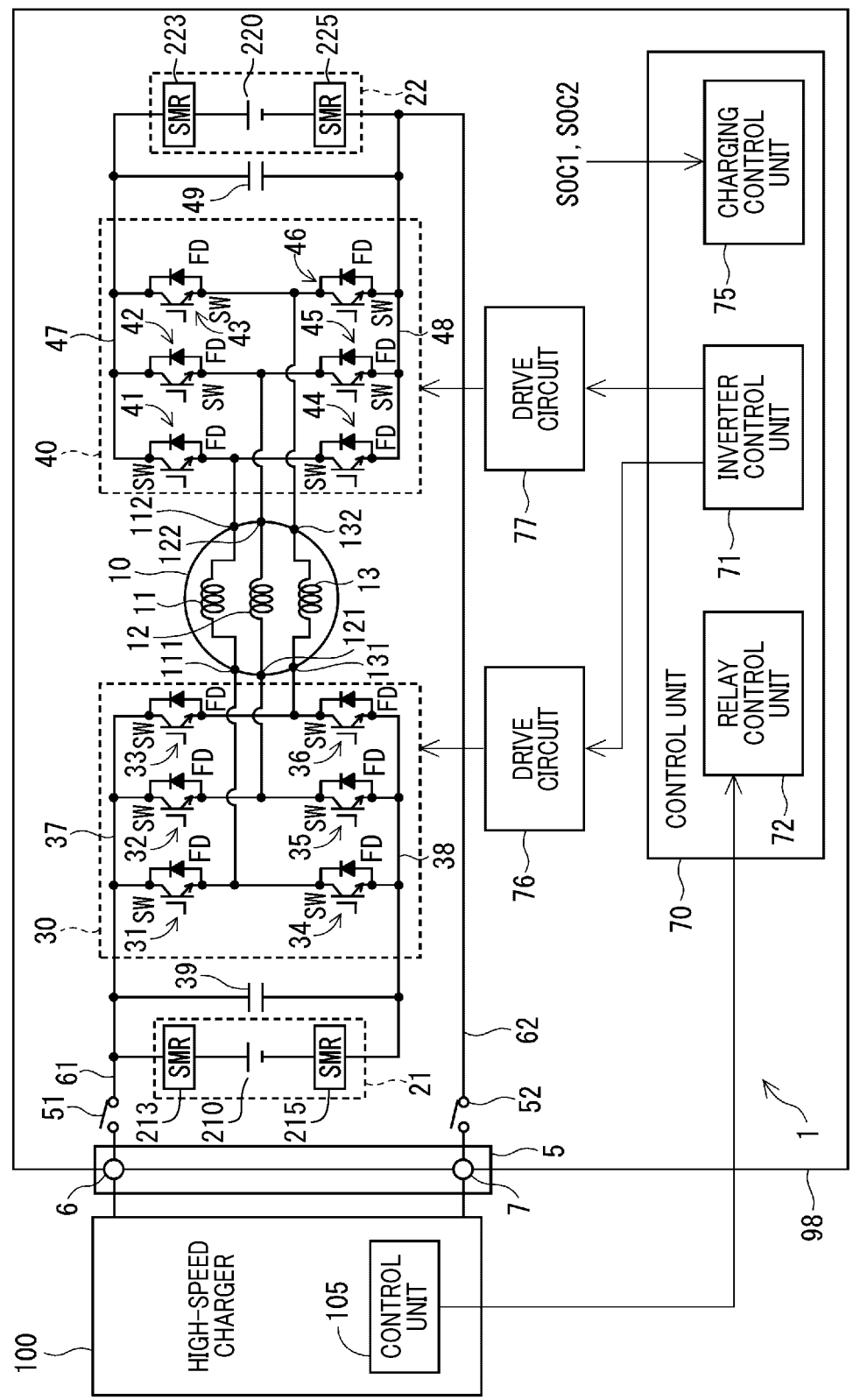
FIG. 1 is a circuit diagram of a charging system according to an embodiment.

A known system drives an alternating-current electric motor that has open-end windings of multiple phases with separated neutral points. For example, JP-A-2016-063702 describes a system that drives an alternating-current electric motor and includes a first inverter and a second inverter. The first inverter includes a first switch that is connected to a first end of a winding of the alternating-current electric motor. The second inverter includes a second switch that is connected to a second end of the winding of the alternating-current electric motor.

In the system in JP-A-2016-063702, a first battery that is connected to the first switch and the second battery that is connected to the second switch are charged by a single-phase alternating-current power supply. However, for example, the system in JP-A-2016-063702 is not applicable to a direct-current high-speed charger (external charger), such as CHAdeMO (registered trademark) or a combined charging system (CCS). Therefore, providing a charging system that is capable of appropriately charging two voltage sources that are connected to open-end windings of a rotating electric machine is desired.

A charging system according to an exemplary embodiment of the present disclosure charges a first voltage source and a second voltage source using an external charger. The first voltage source and the second voltage source are two voltage sources that supply electric power to a rotating electric machine that includes multiphase coils. The charging system includes a first inverter, a second inverter, a first switch, a second switch, and a control unit.

The first inverter includes a plurality of first switching elements that correspond to the multiphase coils. The first inverter is connected to respective first ends of the coils and the first voltage source. The second inverter includes a plurality of second switching elements that correspond to the multiphase coils. The second inverter is connected to respective second ends of the coils and the second voltage source.

The first switch is provided on a first power supply line that connects a high potential side of the first voltage source and a first external connection terminal that is connected to a high potential side of the external charger. The second switch is provided on a second power supply line that connects a low potential side of the second voltage source and a second external connection terminal that is connected to a low potential side of the external charger. The control unit controls on/off switching of the plurality of first switching elements and the plurality of second switching elements.

In the above-described configuration, in a configuration in which the inverters and the voltage sources are provided on both sides of the coils that are the open-end windings of the rotating electric machine, the high-potential-side first power supply line and the low-potential-side second power supply line are provided. The rotating electric machine and the two inverters are used as power paths. As a result, dual-side simultaneous charging in which both of the two voltage sources are simultaneously charged can be performed. In addition, in the above-described configuration, charging can be switched between single-side individual charging in which one of the two voltage sources is charged and dual-side simultaneous charging in which both of the two voltage sources are simultaneously charged (parallel charging in which the two voltage sources are charged in parallel or serial charging in which the two voltage sources are charged in series).

The charging system according to an embodiment of the present disclosure will hereinafter be described with reference to the drawings.

The charging system according to the present embodiment is shown in FIG. 1 to FIG. 11. As shown in FIG. 1, a charging system 1 is mounted in a vehicle 98. The vehicle 98 is provided with an inlet 5. The charging system 1 is provided so as to be capable of connecting to a high-speed charger 100 through the inlet 5. The high-speed charger 100 serves as a direct-current external charger. The inlet 5 is provided with a high-potential-side external connection terminal (first external connection terminal) 6 and a low-potential-side external connection terminal (second external connection terminal) 7. The high-speed charger 100 is a direct-current charger that has a higher voltage than commercial power supply. The high-speed charger 100 includes an external control unit 105 that is capable of communicating with a control unit 70 of the vehicle 98.

The charging system 1 includes a motor generator 10, a first voltage source 21, a second voltage source 22, a first inverter 30, a second inverter 40, a high-potential-side switch (first switch) 51, a low-potential-side switch (second switch) 52, a high-potential-side power supply line (first power supply line) 61, a low-potential-side power supply line (second power supply line) 62, the control unit 70, and the like. The motor generator 10 serves as the rotating electric machine.

For example, the motor generator 10 is a permanent-magnet-type synchronous three-phase alternating-current motor. The motor generator 10 includes a U-phase coil 11, a V-phase coil 12, and a W-phase coil 13. The motor generator 10 is a so-called main machine motor that generates torque for driving a driving wheel (not shown). The motor generator 10 provides a function as an electric motor for driving the driving wheel and a function as a power generator for generating power by being driven by an engine (not shown) and kinetic energy that is transmitted from the driving wheel. The motor generator is referred to, hereafter, as "MG" as appropriate.

Electric power is supplied from the first voltage source 21 and the second voltage source 22 to the MG 10. For example, each of the first voltage source 21 and the second voltage source 22 is a power storage apparatus that is capable of being charged and discharging power, such as a nickel-hydrogen battery or a lithium-ion battery. Instead of a secondary battery, an electric double-layer capacitor or the like may be used as each of the voltage sources 21 and 22. According to the present embodiment, for example, voltage sources that each have a rated voltage of 300 [V] and provide equal performance are used as the first voltage source 21 and the second voltage source 22. However, the first voltage source 21 and the second voltage source 22 may differ in battery performance and type. For example, an output-type voltage source may be used as one of the voltage sources 21 and 22, and a capacitive-type voltage source may be used as the other of the voltage sources 21 and 22. In the drawings and the like, the first voltage source 21 is referred to as a "voltage source 1" and the second voltage source 22 is referred to as a "voltage source 2", as appropriate.

Figure 2:
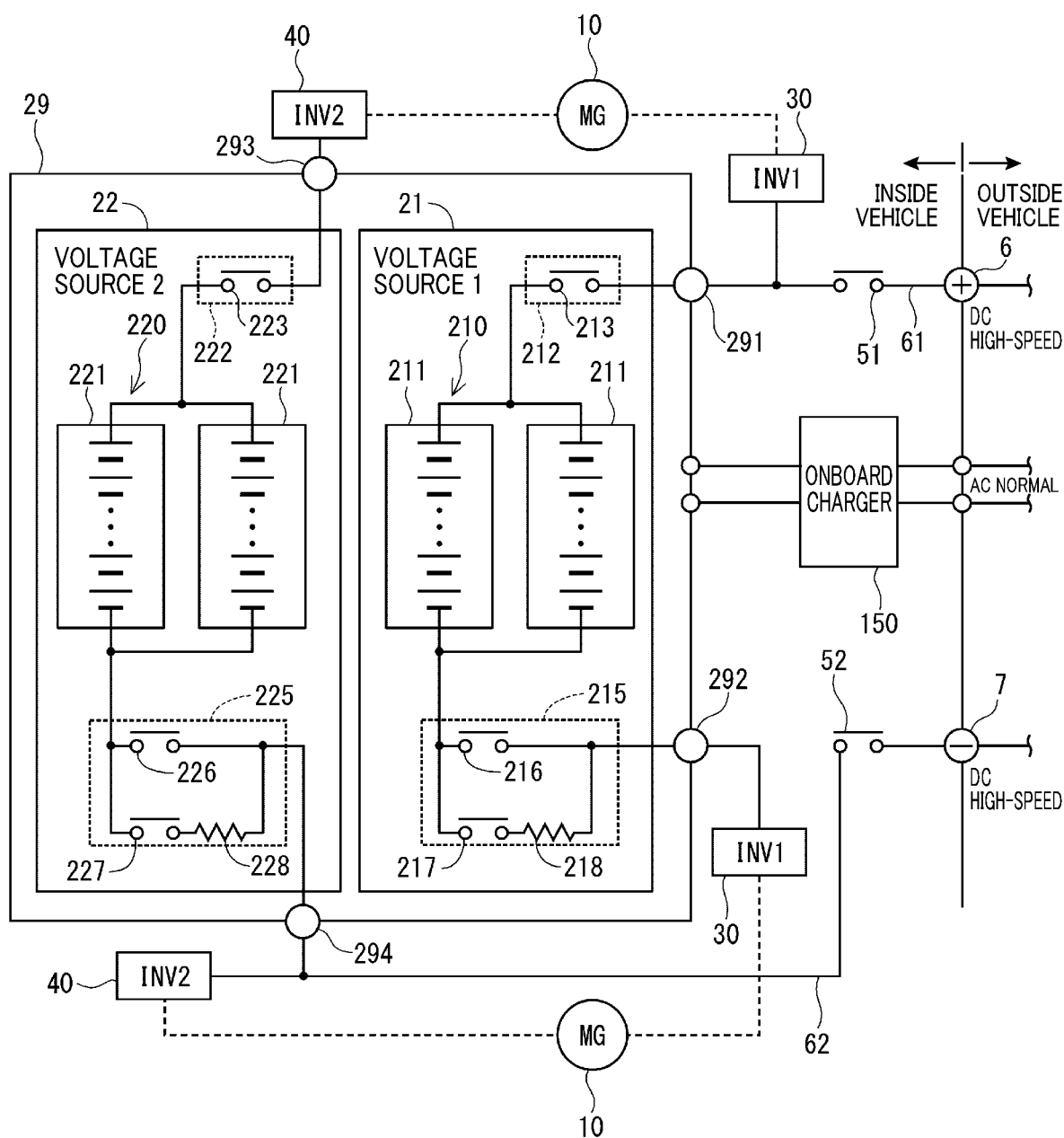
FIG. 2 is a circuit diagram of a battery pack in which a first voltage source and a second voltage source of the charging system according to the embodiment are provided.

As shown in FIG. 2, the first voltage source 21 and the second voltage source 22 are provided in a single battery pack 29, in a state where they are insulated from each other. The battery pack 29 can be connected to the high-speed charger 100 by the external connection terminals 6 and 7. In addition, the battery pack 29 can be connected to an alternating-current power supply, such as commercial power supply, by an onboard charger 150. In FIG. 2, the direct-current high-speed charger 100 is denoted by "DC high-speed". An alternating-current power supply (not shown) that is connected via the onboard charger 150 is denoted by "AC normal".

The first voltage source 21 includes a battery cell module 210, a high-potential-side main relay unit 212, and a low-potential-side main relay unit 215. A plurality of battery cells 211 are connected in parallel to one another in the battery cell module 210.

The high-potential-side main relay unit 212 includes a single relay unit 213. The high-potential-side main relay unit 212 is connected to a high potential side of the battery cell module 210. The low-potential-side main relay unit 215 includes two relay units 216 and 217 that are connected in parallel, and a pre-charge resistor 218 that is connected in series to the relay unit 217. The low-potential-side main relay unit 215 is connected to a low potential side of the battery cell module 210. When the low-potential-side main relay unit 215 is turned on, as a result of a relay to be turned on being changed from the relay unit 217 to the relay unit 216 after the relay unit 217 connected to the pre-charge resistor 218 is turned on, inrush current to a capacitor 39 can be prevented. The control unit 70 controls the on/off switching of the main relay units 212 and 215.

The second voltage source 22 includes a battery cell module 220, a high-potential-side main relay unit 222, and a low-potential-side main relay unit 225. A plurality of battery cells 221 are connected in parallel in the battery cell module 220. In FIG. 2, in each of the battery cell modules 210 and 220, two battery cells are connected in parallel to each other. However, the number of battery cells may be one, or three or more.

The high-potential-side main relay unit 222 includes a single relay unit 223. The high-potential-side main relay unit 222 is connected to a high potential side of the battery cell module 220. The low-potential-side main relay unit 225 includes two relay units 226 and 227 that are connected in parallel, and a pre-charge resistor 228 that is connected in series to the relay unit 227. The low-potential-side main relay unit 225 is connected to a low potential side of the battery cell module 220. When the low-potential-side main relay unit 225 is turned on, as a result of the relay to be turned on being changed from the relay unit 227 to the relay unit 226 after the relay unit 227 connected to the pre-charge resistor 228 is turned on, inrush current to a capacitor 49 can be prevented. The control unit 70 controls the on/off switching of the main relay units 222 and 225.

The battery pack 29 is provided with a first high-potential-side terminal 291 and a first low-potential-side terminal 292 that are connected to the first voltage source 21, and a second high-potential-side terminal 293 and a second low-potential-side terminal 294 that are connected to the second voltage source 22.

A high-potential-side power supply line 61 connects the first high-potential-side terminal 291 and the high-potential-side external connection terminal 6. The high-potential-side power supply line 61 is provided with a high-potential-side switch 51. The second high-potential-side terminal 293 is connected to the high-potential-side external connection terminal 6 via the second inverter 40, the MG 10, the first inverter 30, and the high-potential-side power supply line 61.

A low-potential-side power supply line 62 connects the second low-potential-side terminal 294 and the low-potential-side external connection terminal 7. The low-potential-side power supply line 62 is provided with a low-potential-side switch 52. The first low-potential-side terminal 292 is connected to the low-potential-side external connection terminal 7 via the first inverter 30, the MG 10, the second inverter 40, and the low-potential-side power supply line 62. Any type of switch may be used as the switches 51 and 52 as long as the switch is capable of conducting and blocking current. For example, a semiconductor relay or a mechanical relay is used.

In the drawings, the main relay unit is denoted by "SMR". A state in which the SMR is capable of conducting a current is denoted by "main relay unit on". A state in which the SMR is not capable of conducting a current is denoted by "main relay unit off". In addition, the main relay units 212 and 215 of the first voltage source 21 are denoted by "SMR 1". The main relay units 222 and 225 of the second voltage source 22 are denoted by "SMR 2". In FIG. 2, the MG 10 and the inverters 30 and 40 are shown so as to be divided into two, for purposes of description.

As shown in FIG. 1, the first inverter 30 is a three-phase inverter that switches energization among the coils 11 to 13. The first inverter 30 includes switching elements (first switching elements) 31 to 36 that correspond to the coils 11 to 13. The first inverter 30 is connected to the MG 10 and the first voltage source 21. The second inverter 40 is a three-phase inverter that switches energization among the coils 11 to 13. The second inverter 40 includes switching elements (second switching elements) 41 to 46 that correspond to the coils 11 to 13. The second inverter 40 is connected to the MG 10 and the second voltage source 22. In the drawings and the like, the first inverter 30 is denoted by "INV1" and the second inverter 40 is denoted by "INV2", as appropriate. The switching elements 31 to 36 and 41 to 46 of the inverters 30 and 40 are denoted by "elements", as appropriate.

Each of the switching elements 31 to 36 and 41 to 46 includes a switch unit SW and a freewheeling diode FD. The control unit 70 controls an on/off operation of the switch unit SW. The switch unit SW according to the present embodiment is an insulated-gate bipolar transistor (IGBT). However, other elements, such as a metal-oxide-semiconductor field-effect transistor (MOSFET), may be used. In addition, the elements that are used as the switching elements 31 to 36 and 41 to 46 may differ from one another.

The freewheeling diode FD is connected in parallel to the switch unit SW. The freewheeling diode FW allows a current to be circulated from the low potential side to the high potential side through the freewheeling diode FW. For example, the freewheeling diode FD may be provided inside the switching element in the form of a parasitic diode of a MOSFET, for example. Alternatively, the freewheeling diode FD may be provided outside the switching element. In addition, the freewheeling diode FD may be a switch such as an IGBT or a MOSFET that is connected so as to allow a current to be circulated through the switch.

In the first inverter 30, the U-phase, V-phase, and W-phase switching elements 31 to 33 are connected to the high potential side (upper arm side), and the U-phase, V-phase, and W-phase switching elements 34 to 36 are connected to the low potential side (lower arm side). Hereafter, the high-potential-side switching elements 31 to 33 of the first inverter 30 are referred to as "first upper arm elements". The low-potential-side switching elements 34 to 36 of the first inverter 30 are referred to as "first lower arm elements". First high-potential-side wiring 37 that connects the high potential sides of the first upper arm elements 31 to 33 is connected to the high potential side of the first voltage source 21. First low-potential-side wiring 38 that connects the low potential sides of the first lower arm elements 34 to 36 is connected to the low potential side of the first voltage source 21.

In the first inverter 30, a first end 111 of the U-phase coil 11 is connected to a connection point between the two switching elements 31 and 34 of the U-phase that are connected in series. A first end 121 of the V-phase coil 12 is connected to a connection point between the two switching elements 32 and 35 of the V-phase that are connected in series. A first end 131 of the W-phase coil 13 is connected to a connection point between the two switching elements 33 and 36 of the W-phase that are connected in series.

In the second inverter 40, the U-phase, V-phase, and W-phase switching elements 41 to 43 are connected to the high potential side (upper arm side), and the U-phase, V-phase, and W-phase switching elements 44 to 46 are connected to the low potential side (lower arm side). Hereafter, the high-potential-side switching elements 41 to 43 of the second inverter 40 are referred to as "second upper arm elements". The low-potential-side switching elements 44 to 46 of the second inverter 40 are referred to as "second lower arm elements". Second high-potential-side wiring 47 that connects the high potential sides of the second upper arm elements 41 to 43 is connected to the high potential side of the second voltage source 22. Second low-potential-side wiring 48 that connects the low potential sides of the second lower arm elements 44 to 46 is connected to the low potential side of the second voltage source 22.

In the second inverter 40, a second end 112 of the U-phase coil 11 is connected to a connection point between the two switching elements 41 and 44 of the U-phase that are connected in series. A second end 122 of the V-phase coil 12 is connected to a connection point between the two switching elements 42 and 45 of the V-phase that are connected in series. A second end 132 of the W-phase coil 13 is connected to a connection point between the two switching elements 43 and 46 of the W-phase that are connected in series.

In this manner, according to the present embodiment, the coils 11 to 13 of the MG 10 are open-end windings. A "dual-power-supply dual-inverter electric motor driving system" in which the first inverter 30 and the second inverter 40 are connected to both ends of the coils 11 to 13 is formed.

The first capacitor 39 is connected to the high-potential-side wiring 37 and the low-potential-side wiring 38. The first capacitor 39 is provided in parallel with the first inverter 30. The second capacitor 49 is connected to the high-potential-side wiring 47 and the low-potential-side wiring 48. The second capacitor 49 is provided in parallel with the second inverter 40. The capacitors 39 and 49 are smoothing capacitors that smooth voltages applied to the inverters 30 and 40.

The high-potential-side power supply line 61 in which the high-potential-side switch 51 is provided is directly connected to the high potential side of the first voltage source 21 and the high-potential-side external connection terminal 6, without the MG 10 and the inverters 30 and 40 therebetween. In addition, the low-potential-side power supply line 62 in which the low-potential-side switch 52 is provided is directly connected to the low-potential side of the second voltage source 22 and the low-potential-side external connection terminal 7, without the MG 10 and the inverters 30 and 40 therebetween.

The control unit 70 is mainly configured by a microcomputer or the like. In any case, the control unit 70 includes therein a central processing unit (CPU), a read-only memory (ROM), a random access memory (RAM), an input/output (I/O), a bus line that connects these components, and the like. Processes that are performed by the control unit 70 may be software processes that are performed by the CPU running a program that is stored in advance in a tangible memory apparatus (that is, a non-transitory computer readable storage medium), such as the ROM. Alternatively, the processes may be hardware processes that are performed by an electronic circuit, such as a field-programmable gate array (FPGA).

The control unit 70 includes an inverter control unit 71, a relay control unit 72, and a charging control unit 75. The inverter control unit 71 controls the on/off switching of the switching elements 31 to 36 and 41 to 46. A control signal related to driving control of the first inverter 30 is outputted to the first inverter 30 through a first drive circuit 76. A control signal related to driving control of the second inverter 40 is outputted to the second inverter 40 through a second drive circuit 77. A single microcomputer may control the inverters 30 and 40. Alternatively, each of the inverters 30 and 40 may be provided with a microcomputer.

Here, driving modes of the MG 10 will be described. The driving modes include "single-side driving mode" and "dual-side driving mode". In the single-side driving mode, electric power from the first voltage source 21 or the second voltage source 22 is used. In the dual-side driving mode, electric power from the first voltage source 21 and electric power from the second voltage source 22 are used. The driving mode is switched between the single-side driving mode and the dual-side driving mode based on an operation point, driving conditions, and the like. Other driving modes may also be included.

In the single-side driving mode, the upper arm elements of all phases or the lower arm elements of all phases of one inverter are turned on, and a neutral point is formed. The other inverter is controlled by pulse width modulation (PWM) control, rectangular wave control, or the like, based on a driving request.

In the dual-side driving mode, a phase of a fundamental wave in the PWM control is inverted by the first inverter 30 and the second inverter 40. Modulation factors may differ between the first inverter 30 and the second inverter 40. In addition, if the modulation factor is infinite, the rectangular wave control may be performed. As a result, the voltage sources 21 and 22 can be connected in series. A voltage that corresponds to a sum of the voltages of the voltage sources 21 and 22 can be applied to the MG 10, and output can be increased.

The relay control unit 72 controls the high-potential-side switch 51 and the low-potential-side switch 52 based on a command from the external control unit 105 that controls the high-speed charger 100. The switches 51 and 52 are closed at a charging start timing and opened at a charging end timing. That is, the switches 51 and 52 that are directly connected to the external connection terminals 6 and 7 are controlled by a command from the high-speed charger 100 side, and are continuously held in a closed state during charging.

The charging control unit 75 acquires information related to a charging state, such as a state of charge (SOC), of each of the first voltage source 21 and the second voltage source 22, and controls the states of charge of the voltage sources 21 and 22. Hereafter, the SOC of the first voltage source 21 is referred to as SOC1 and the SOC of the second voltage source 22 is referred to as SOC2. The charging control unit 75 may be provided as a separate electronic control unit (ECU).

Here, a plurality of charging standards have been established regarding the high-speed charger 100, such as CHAdeMO with a voltage specification of 500 V, and CCS with a voltage specification of 1000 V. In addition, for example, if a rated voltage of each of the voltage sources 21 and 22 is 300 V, when the high-speed charger 100 has a voltage specification of 500 V, the sum of the rated voltages of the two voltage sources 21 and 22 exceed 500 V and the two voltage sources 21 and 22 cannot be charged in series. Thus, the two voltage sources 21 and 22 are required to be charged in parallel. Meanwhile, when the high-speed charger 100 has a voltage specification of 1000 V, serial charging of the two voltage sources 21 and 22 becomes possible. Furthermore, in cases in which a difference in SOCs is significant, or charging of either of the voltage sources 21 and 22 is unnecessary, individual charging of one of the voltage sources 21 and 22 is necessary. According to the present embodiment, to actualize high output in the dual-side driving mode, depletion of either of the voltage sources 21 and 22 is preferably prevented, and the SOCs of both voltage sources 21 and 22 are preferably maintained to a degree that dual-side driving can be performed.

Therefore, according to the present embodiment, the MG 10 and the inverters 30 and 40 are used as power paths for charging power. As a result, single-side individual charging in which either of the voltage sources 21 and 22 is charged and dual-side simultaneous charging in which both voltage sources 21 and 22 are simultaneously charged are performed without a separate charger or the like being provided. Dual-side simultaneous charging includes parallel charging in which both voltage sources 21 and 22 are charged in parallel to each other and serial charging in which both voltage sources 21 and 22 are charged in series to each other. As a result, the voltage sources 21 and 22 can be appropriately charged. Here, the MG 10 according to the present embodiment is the main machine motor. The MG 10 and the inverters 30 and 40 are designed for large output and are capable of sufficiently withstanding even charging by the high-speed charger 100 of which supplied power is large.

Next, parallel charging, serial charging, and individual charging of the voltage sources 21 and 22 will be described based on FIG. 3 to FIG. 6. In FIG. 3 to FIG. 6, the voltage sources 21 and 22 are each denoted by a single battery symbol. Some of the configurations, such as the control unit 70, and reference numbers are omitted. During charging, the switches 51 and 52 are closed, and the main relay units 212, 215, 222, and 225 are turned on.

Figure 3:
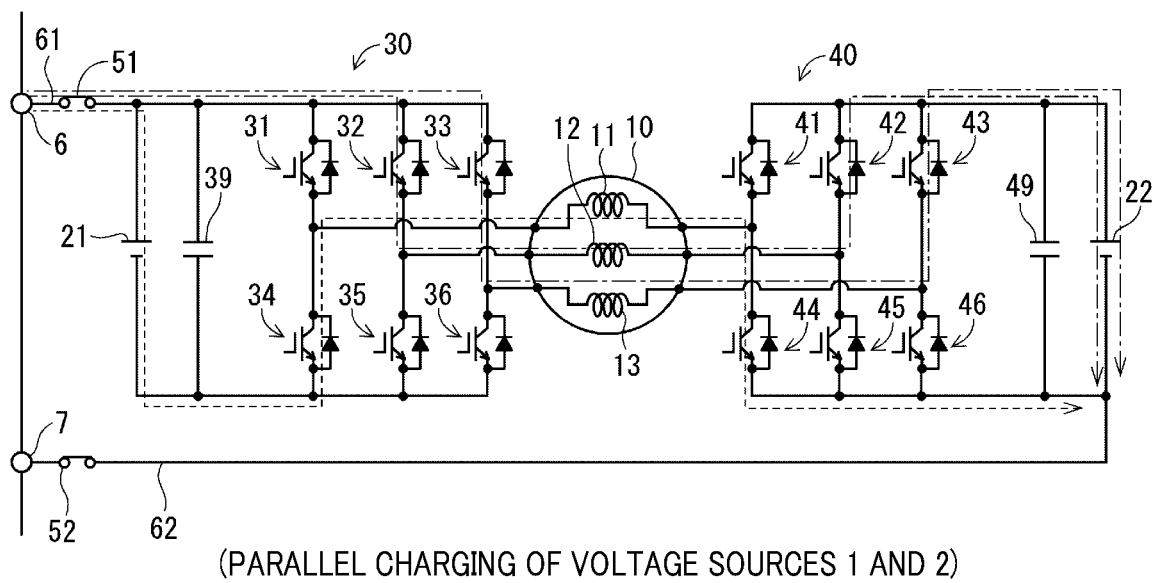
FIG. 3 is an explanatory diagram for explaining parallel charging of the first voltage source and the second voltage source in the charging system according to the embodiment.

As shown in FIG. 3, when parallel charging of the voltage sources 21 and 22 is performed, at least the first upper arm element of a first phase is turned on. At least the second lower arm element of a second phase that differs from the first phase of which the first upper arm element is turned is turned on. In the example in FIG. 3, the V-phase and W-phase first upper arm elements 32 and 33 and the U-phase second lower arm element 44 are turned on.

In FIG. 3, as indicated by a broken-line arrow, the first voltage source 21 is charged as a result of a current flowing through the freewheeling diode FD of the U-phase first lower arm element 34, the U-phase coil 11, and the switch unit SW of the U-phase second lower arm element 44. In addition, as indicated by a single-dot-chain-line arrow, the second voltage source 22 is charged as a result of a current flowing through the switch units SW of the V-phase and W-phase first upper arm elements 32 and 33, the V-phase coil 12, the W-phase coil 13, and the freewheeling diodes FD of the V-phase and W-phase second upper arm elements 42 and 43. Consequently, the voltage sources 21 and 22 can be simultaneously charged in parallel.

Here, when the second voltage source 22 has a lower electric potential than the first voltage source 21, as shown in FIG. 3, the second voltage source 22 is charged by two phases, the V-phase and the W-phase. The first voltage source 21 is charged by one phase, the U-phase. Here, when the first voltage source 21 has a lower electric potential than the second voltage source 22, the first voltage source 21 is charged by two phases and the second voltage source 22 is charged by one phase. The elements to be energized (energization elements) among all elements 31 to 36 and 41 to 46 of the three phases can be arbitrarily selected. For example, elements other than the elements that had been turned on when charging was previously performed are turned on.

In addition, when the switching elements 31 to 36 and 41 to 46 are MOSFETs, after the start of charging is confirmed, synchronous rectification may be performed by the U-phase first lower arm element 34, the V-phase second upper arm element 42, and the W-phase second upper arm element 43 that are on an energization path from the low potential side to the high potential side being turned on. In the cases of serial charging and individual charging as well, the switch units SW of which the freewheeling diodes FD serve as the energization path may be similarly turned on. As a result, conduction loss can be reduced.

Figure 4:
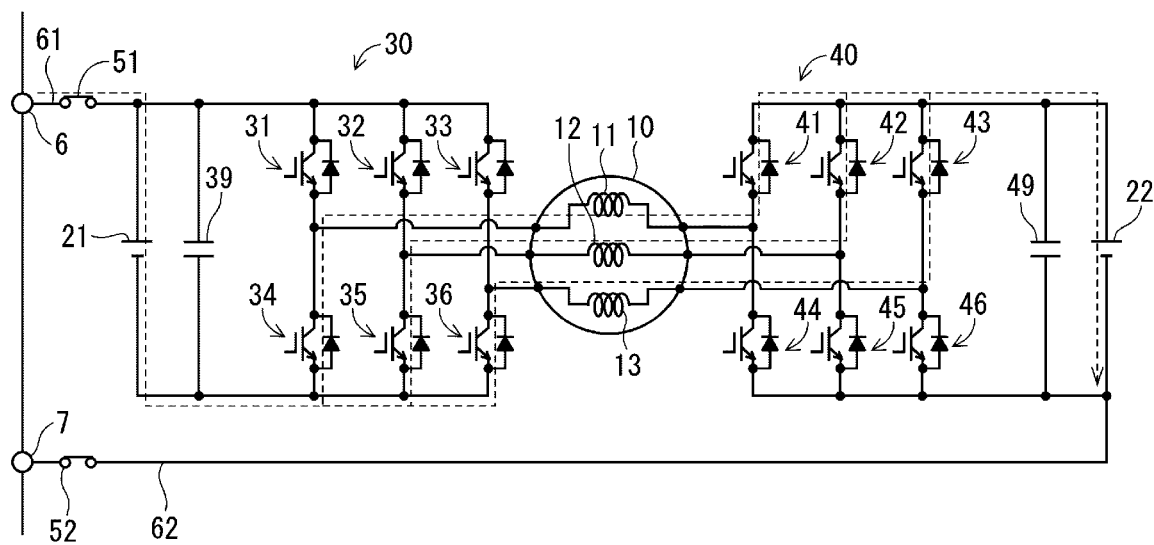
FIG. 4 is an explanatory diagram for explaining serial charging of the first voltage source and the second voltage source in the charging system according to the embodiment.

As shown in FIG. 4, when serial charging of the voltage sources 21 and 22 is performed, in a state in which all elements 31 to 36 and 41 to 46 are turned off, when the switches 51 and 52 are turned closed and the main relay units 212, 215, 222, and 225 are turned on, as indicated by a broken-line arrow, the current flows through the freewheeling diodes FD of the first lower arm elements 34 to 36, the coils 11 to 13, and the freewheeling diodes FD of the second upper arm elements 41 to 43. Consequently, the voltage sources 21 and 22 can be simultaneously charged in series.

Figure 5:
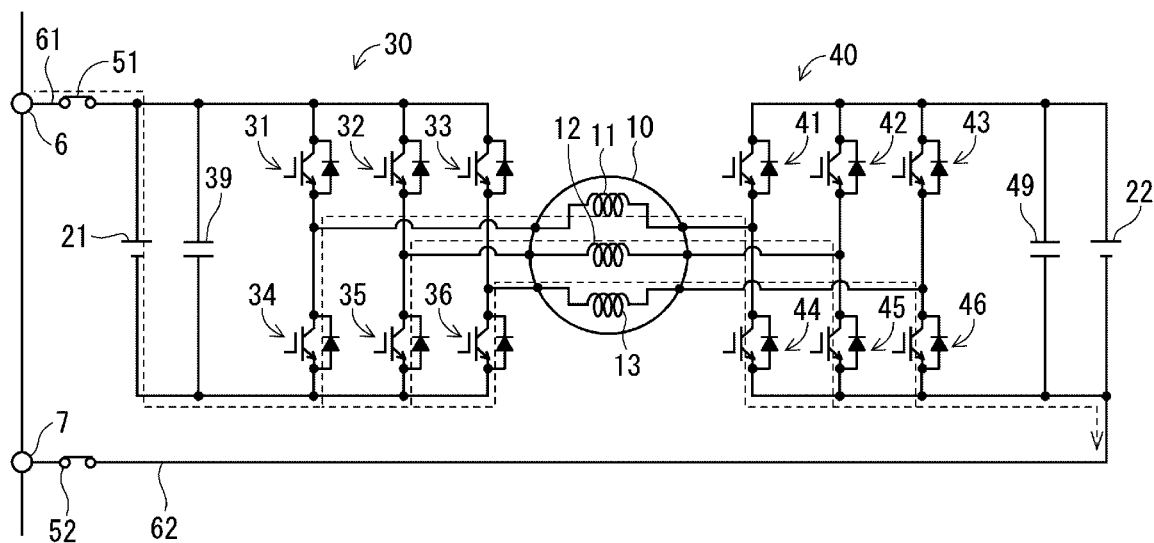
FIG. 5 is an explanatory diagram for explaining individual charging of the first voltage source in the charging system according to the embodiment.

As shown in FIG. 5, when individual charging of the first voltage source 21 is performed, when the second lower arm elements 44 to 46 are turned on, as indicated by a broken-line arrow, the current flows through the freewheeling diodes FD of the first lower arm elements 34 to 36, the coils 11 to 13, and the switch units SW of the second lower arm elements 44 to 46. Consequently, individual charging of the first voltage source 21 can be performed.

Figure 6:
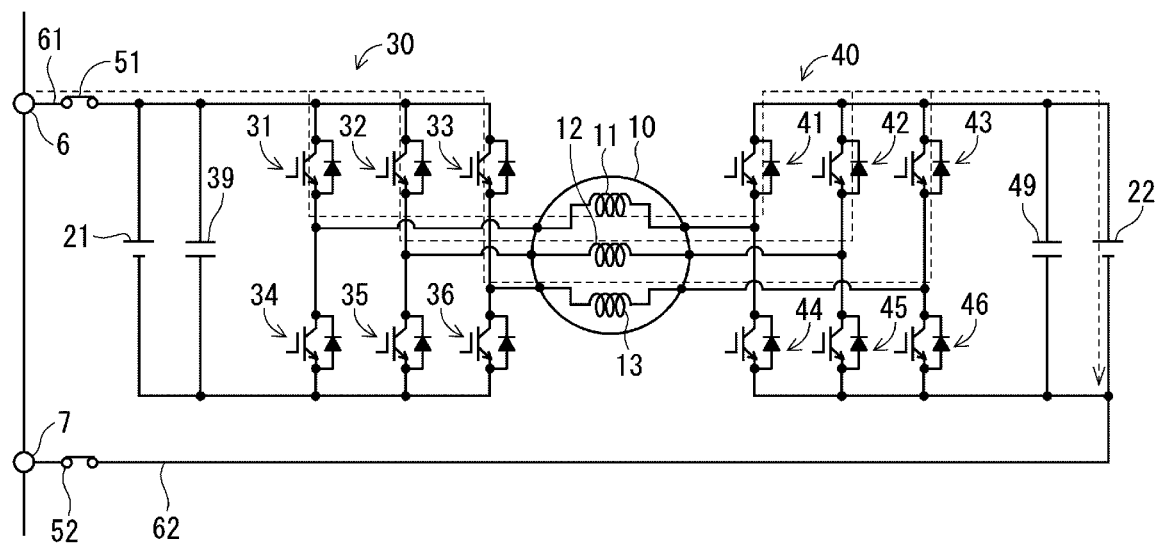
FIG. 6 is an explanatory diagram for explaining individual charging of the second voltage source in the charging system according to the embodiment.

As shown in FIG. 6, when individual charging of the second voltage source 22 is performed, when the first upper arm elements 31 to 33 are turned on, as indicated by a broken-line arrow, the current flows through the switch units SW of the first upper arm elements 31 to 33, the coils 11 to 13, and the freewheeling diodes FD of the second upper arm elements 41 to 43. Consequently, individual charging of the second voltage source 22 can be performed. According to the present embodiment, when individual charging of the voltage source 21 or 22 is performed, the switching elements of the three phases by which energization from the high potential side to the low potential side is performed are turned on. However, the present disclosure is not limited thereto. The number of phases of the switching elements to be turned on may be one phase or two phases.

Figure 7:
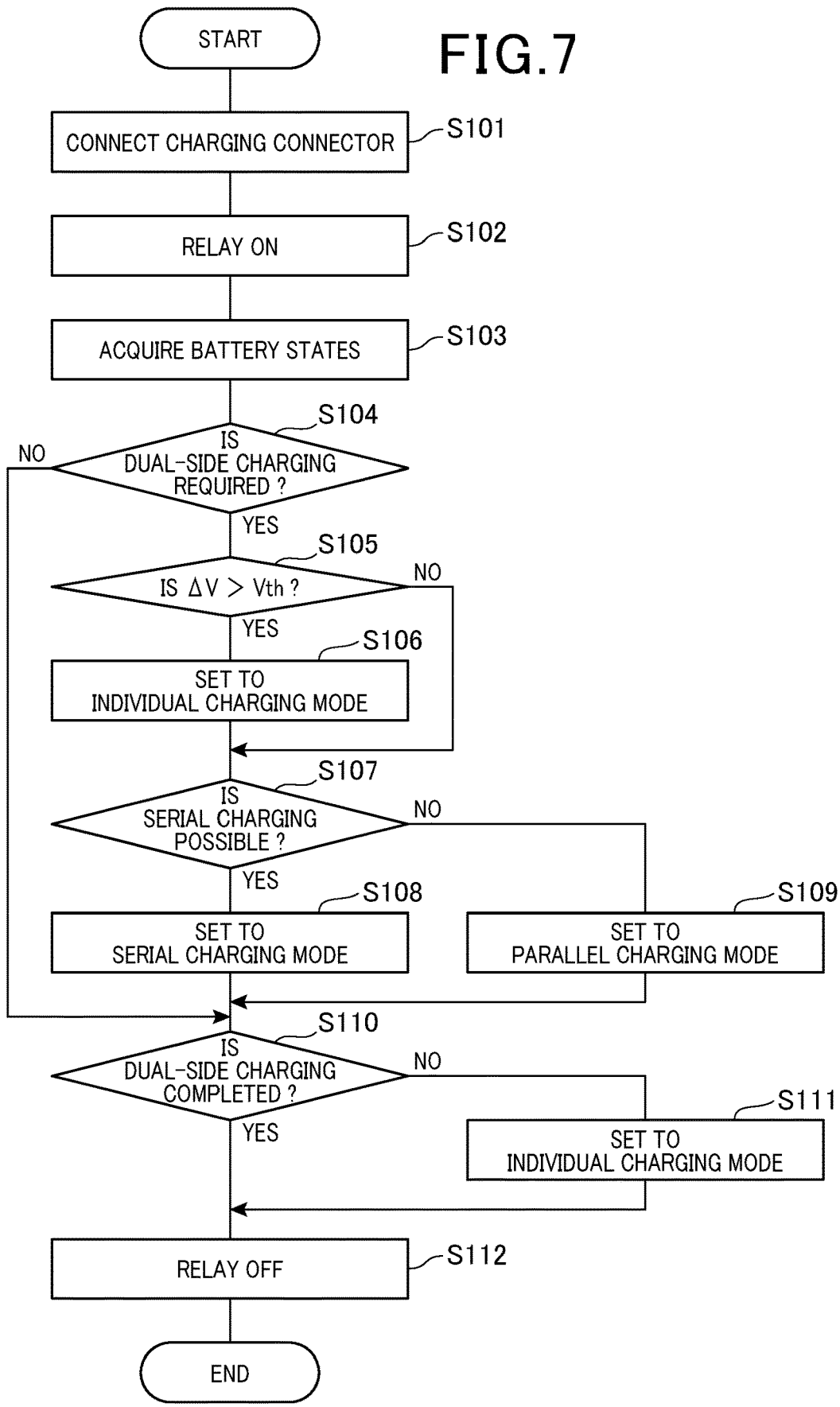
FIG. 7 is a flowchart of a charging control process in the charging system according to the embodiment.

Next, a charging control process according to the present embodiment will be described with reference to a flowchart in FIG. 7.

The charging control process can be performed by the control unit 70 while the vehicle is stopped. Hereafter, "step" of step S101 is omitted and simply denoted by symbol "S". This similarly applies to other steps. The switches 51 and 52 are denoted by "relays".

When a charging connector of the high-speed charger 100 is connected to the inlet 5 at S101, at S102, the relay control unit 72 closes the switches 51 and 52 based on a command from the external control unit 105 (relay ON). At this time, the output from the high-speed charger 100 is 0. At step S103, the charging control unit 75 acquires battery states, such as electric potentials and SOCs, of the voltage sources 21 and 22.

At step S104, the charging control unit 75 determines whether charging of both voltage sources 21 and 22 is required. Here, when the SOC is equal to or greater than a completion determination threshold Fth (such as 80%), the charging control unit 75 determines that charging is completed and unnecessary. As a result, when determined that charging of either of the voltage sources 21 and 22 is unnecessary (NO at S104), the control unit 70 proceeds to S110. Meanwhile, when determined that charging of both voltage sources 21 and 22 is necessary (Yes at S104), the control unit 70 proceeds to S105.

At S105, the charging control unit 75 determines whether a potential difference ΔV between the first voltage source 21 and the second voltage source 22 is greater than a potential difference determination threshold Vth. The potential difference determination threshold Vth is set to a value at about which the voltage sources 21 and 22 can be simultaneously charged either in parallel or in series. When determined that the potential difference ΔV is greater than the potential difference determination threshold Vth (YES at S105), the control unit 70 proceeds to S106. The control unit 70 sets the charging mode to individual charging mode in which individual charging of the voltage source 21 or 22 is performed. When determined that the potential difference ΔV has become equal to or less than the potential difference determination threshold Vth, the control unit 70 ends individual charging and proceeds to S107. When determined that the potential difference ΔV is equal to or less than the potential difference determination value Vth (NO at S105), the control unit 70 proceeds to S107. Details of each charging mode will be described hereafter.

At S107, the charging control unit 75 determines whether serial charging of the voltage sources 21 and 22 can be performed. Here, the charging control unit 75 determines that serial charging of the voltage sources 21 and 22 can be performed when the voltage that can be applied by the high-speed charger 100 is equal to or greater than a sum of the rated voltages of the voltage sources 21 and 22. Alternatively, the charging control unit 75 may perform the determination based on the standard and the like of the charger that is connected. For example, the charging control unit 75 may determine that serial charging of the voltage sources 21 and 22 can be performed when the high-speed charger 100 that is connected is CCS. The charging control unit 75 may determine that serial charging of the voltage sources 21 and 22 cannot be performed when the high-speed charger 100 is CHAdeMO. As a result, when determined that serial charging of the voltage sources 21 and 22 can be performed (YES at S107), the control unit 70 proceeds to S108 and sets the charging mode to serial charging mode in which serial charging of the voltage sources 21 and 22 is performed. Meanwhile, when determined that serial charging of the voltage sources 21 and 22 cannot be performed (NO at S107), the control unit 70 proceeds to S109 and sets the charging mode to parallel charging mode in which parallel charging of the voltage sources 21 and 22 is performed. When charging of at least either of the voltage sources 21 and 22 is completed in serial charging mode or parallel charging mode, the control unit 70 ends the serial charging mode or the parallel charging mode and proceeds to S110.

At S110, the charging control unit 75 determines whether charging of both voltage sources 21 and 22 is completed. As a result, when determined that charging of one voltage source is not completed (NO at S110), the control unit 70 proceeds to S111 and sets the charging mode to individual charging mode in which individual charging of the voltage source of which charging is not completed is performed. In individual charging mode, when charging of the voltage source of which charging has not been completed is completed, the control unit 70 ends the individual charging mode and proceeds to S112. Meanwhile, when determined that charging of both voltage sources 21 and 22 is completed at S110 (YES at S110), the control unit 70 proceeds to S112.

At S112, the control unit 70 notifies the external control unit 105 of information that indicates that charging is completed. The relay control unit 72 opens the switches 51 and 52 (relay OFF) based on a command from the external control unit 105.

Here, the charging connector may be detached during charging, and charging may be interrupted. According to the present embodiment, when the potential difference $\Delta V$ is large, a state in which dual-side driving can be performed is ensured to the greatest extent possible by the voltage source that has the lower electric potential being preferentially charged.

Next, a charging process in individual charging mode will be described with reference to a flowchart in FIG. 8.

At S201, the charging control unit 75 determines whether the voltage source that requires charging is the first voltage source 21. In the individual charging mode at S106, the voltage source of which the voltage is lower is selected as the voltage source that requires charging. In addition, in the individual charging mode at S111, the voltage source of which charging is not completed is selected as the voltage source that requires charging. When determined that the voltage source that requires charging is not the first voltage source 21 (NO at S201), that is, when determined that the voltage source that requires charging is the second voltage source 22, the control unit 70 proceeds to S206. When determined that the voltage source that requires charging is the first voltage source 21 (YES at S201), the control unit 70 proceeds to S202.

At S202, the inverter control unit 71 turns off all elements 31 to 36 of the first inverter 30 and the second upper arm elements 41 to 43, and turns on the second lower arm elements 44 to 46. At S203, the control unit 70 notifies the external control unit 105 of information indicating that preparation for power reception is completed. Upon receiving the notification of completion of preparation for power reception, the external control unit 105 starts power supply.

When power supply is started, at S204, the control unit 70 performs individual charging of the first voltage source 21.

At S204m, when the switching elements are MOSFETs or the like, and capable of enabling energization from the low potential side to the high potential side through the switch units SW by being turned on, after confirmation of energization, the inverter control unit 71 turns on the lower arm elements 34 to 36 of the first inverter 30. In addition, if the lower arm elements 34 to 36 already are turned on, the on-state is maintained. Here, when the switching elements are IGBTs or the like, and incapable of enabling energization from the low potential side to the high potential side through the switch units SW, S204m is omitted. Furthermore, depending on conduction loss in the switch unit SW and the freewheeling diode FD, S204m can be omitted. This similarly applies to steps described hereafter, such as S208m, in which "m" is attached to the end of the step number.

At S205, the charging control unit 75 determines whether the charging state of the first voltage source 21 has reached a target. In the individual charging mode at S106, the charging control unit 75 determines that the target has been reached when the potential difference $\Delta V$ is equal to or less than the potential difference determination threshold Vth. In addition, in the individual charging mode at S111, the charging control unit 75 determines that the target has been reached when the SOC of the first voltage source 21 is equal to or greater than the completion determination threshold Fth. When determined that the charging state of the first voltage source 21 has not reached the target (NO at S205), the control unit 70 returns to S204 and continues individual charging of the first voltage source 21. When determined that the charging state of the first voltage source 21 has reached the target (YES at S205), the control unit 70 proceeds to S210.

At S206 to which the control unit 70 proceeds after determining NO at S201, the inverter control unit 71 turns on the first upper arm elements 31 to 33, and turns off the first lower arm elements 34 to 36 and all elements 41 to 46 of the second inverter 40. At S207, in a manner similar to that at S203, the control unit 70 notifies the external control unit 105 of the information indicating that preparation for power reception is completed. Upon receiving the notification of completion of preparation for power reception, the external control unit 105 starts power supply. When power supply is started, at S208, the control unit 70 performs individual charging of the second voltage source 22.

At S208m, when the switching elements are MOSFETs or the like, and capable of enabling energization from the low potential side to the high potential side through the switch units SW by being turned on, after confirmation of energization, the inverter control unit 71 turns on the upper arm elements 41 to 43 of the second inverter 40. In addition, if the upper arm elements 41 to 43 already are turned on, the on-state is maintained.

At S209, the charging control unit 75 determines whether the charging state of the second voltage source 22 has reached a target. Here, in a manner similar to that at S205, in the individual charging mode at S106, the charging control unit 75 determines that the target has been reached when the potential difference $\Delta V$ is equal to or less than the potential difference determination threshold Vth. In addition, in the individual charging mode at S111, the charging control unit 75 determines that the target has been reached when the SOC of the second voltage source 22 is equal to or greater than the completion determination threshold Fth. When determined that the charging state of the second voltage source 22 has not reached the target (NO at S209), the control unit 70 returns to S208 and continues individual charging of the second voltage source 22. When determined that the charging state of the second voltage source 22 has reached the target (YES at S209), the control unit 70 proceeds to S210.

At S210, the control unit 70 transmits a power supply stop command to the external control unit 105. Upon receiving the power supply stop command, the external control unit 105 stops power supply from the high-speed charger 100. At S211, the inverter control unit 71 turns off all elements 31 to 36 and 41 to 46 of the inverters 30 and 40, and ends the individual charging mode.

Next, a charging process in parallel charging mode will be described with reference to a flowchart in FIG. 9.

At S301, the charging control unit 75 selects energization elements that serve as a conduction path, among all elements 31 to 36 and 41 to 46 of the inverters 30 and 40. According to the present embodiment, the charging control unit 75 selects the energization elements, among all elements 31 to 36 and 41 to 46 of the inverters 30 and 40, such that an element that was not energized during a previous charging is preferentially selected as the energization element. As a result, imbalance in element deterioration can be reduced.

Figure 11A:
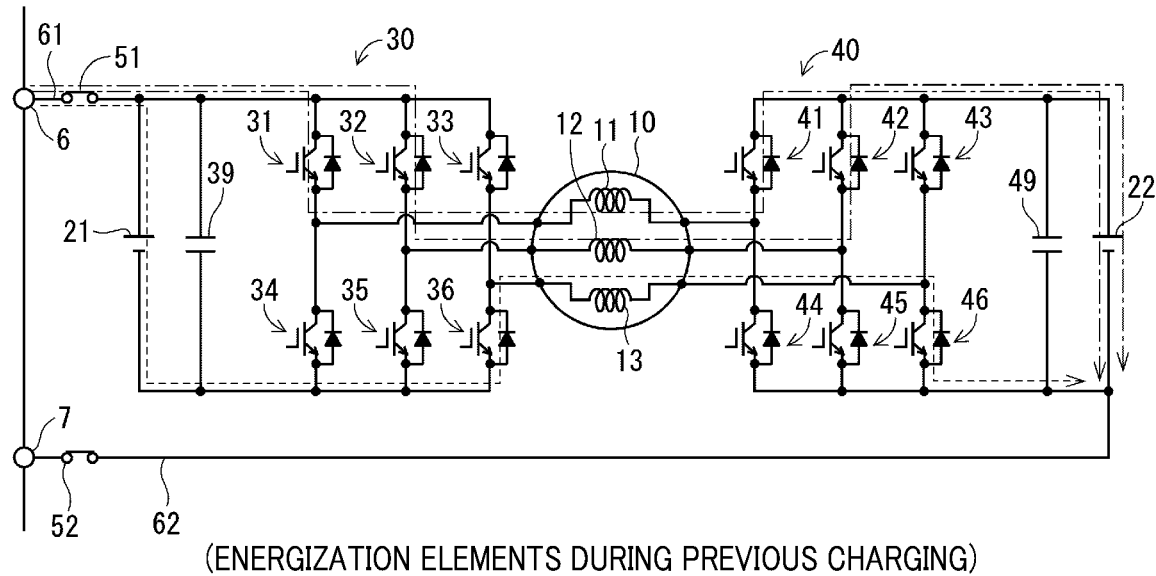
FIG. 11A and FIG. 11B are explanatory diagrams for explaining selection of energization elements in the charging system according to the embodiment.
Figure 11B:
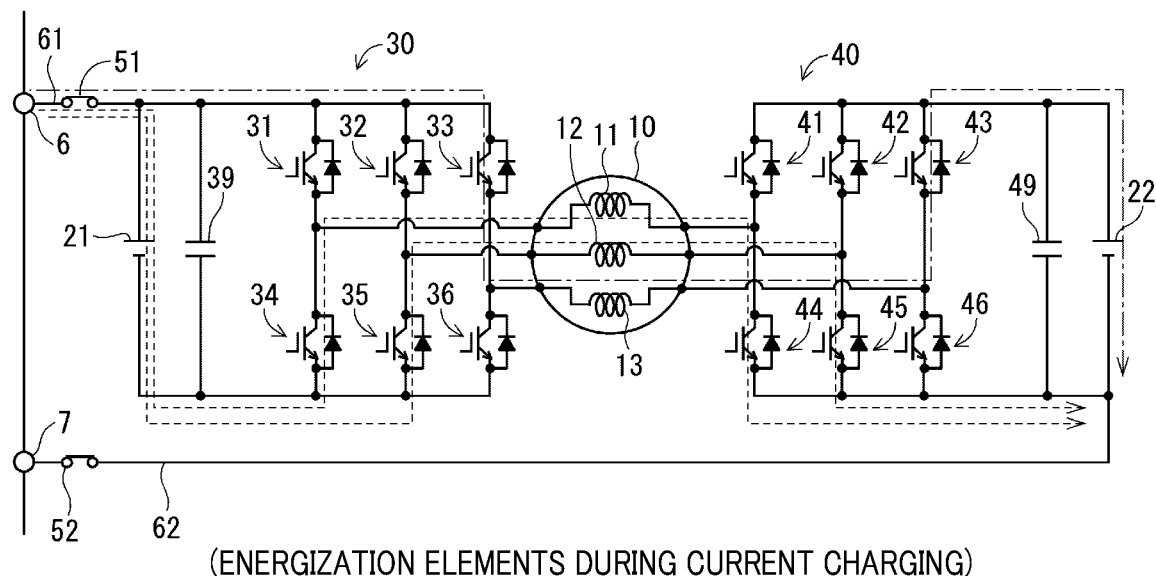

For example, as shown in FIG. 11A, when parallel charging was performed using the upper arm elements 31, 32, 41, and 42 of the U-phase and the V-phase, and the lower arm elements 36 and 46 of the W-phase as the energization elements during the previous charging, as shown in FIG. 11B, at the current charging, the lower arm elements 34, 35, 44, and 45 of the U-phase and V-phase, and the upper arm elements 33 and 34 of the W-phase are selected as the energization elements. In addition, the current energization elements may be selected based on the energization elements used in the most recent parallel charging. That is, for example, when the previous charging was individual charging or serial charging, and parallel charging was not performed, and parallel charging had been performed in the charging before the previous charging, the elements that had not been energized during the parallel charging that had been performed before the previous charging are selected as the energization elements. Moreover, if imbalance in the state of element deterioration is not present, arbitrary elements may be selected as the energization elements.

Returning to FIG. 9, at S302, the inverter control unit 71 turns on the selected energization elements. At S303, the control unit 70 notifies the external control unit 105 of the information indicating that preparation for power reception is completed. Upon receiving the notification of completion of preparation for power reception, the external control unit 105 starts power supply. When power supply is started, at S304, in a state in which the voltage sources 21 and 22 are connected in parallel, the control unit 70 performs simultaneous charging of the voltage sources 21 and 22.

At S304m, when the switching elements are MOSFETs or the like, and capable of enabling energization from the low potential side to the high potential side through the switch units SW by being turned on, after confirmation of energization, the inverter control unit 71 turns on the elements of which the freewheeling diodes FD serve as the energization path. For example, in the example in FIG. 11A, the inverter control unit 71 turns on the first lower arm element 36, and the second upper arm elements 41 and 42. In addition, for example, in an example in FIG. 11B, the inverter control unit 71 turns on the first lower arm elements 34 and 35, and the second upper arm element 43. Furthermore, if the elements already are turned on, the on-state is maintained.

At S305, the charging control unit 75 determines whether the states of charge of the voltage sources 21 and 22 have reached the target. According to the present embodiment, when at least either of the SOC1 and the SOC2 is equal to or greater than the completion determination threshold Fth, the charging control unit 75 determines that the target has been reached. When determined that the states of charge of the voltage sources 21 and 22 have not reached the target (NO at S305), that is, when the SOC1 and the SOC2 are both less than the completion determination threshold Fth, the control unit 70 returns to S304 and continues parallel charging of the voltage sources 21 and 22. When determined that the states of charge of the voltage sources 21 and 22 have reached the target (YES at S305), that is, when determined that at least either of the SOC1 and the SOC2 is equal to or greater than the completion determination threshold Fth, the control unit 70 proceeds to S306.

At S306, the control unit 70 transmits the power supply stop command to the external control unit 105. Upon receiving the power supply stop command, the external control unit 105 stops power supply from the high-speed charger 100. At S307, the inverter control unit 71 turns off all elements of the inverters 30 and 40. At S308, the charging control unit 75 stores the current energization elements in a storage unit or the like (not shown) and ends the parallel charging mode.

Next, a charging process in the serial charging mode will be described with reference to the flowchart in FIG. 10.

At S401, the inverter control unit 71 turns off all elements 31 to 36 and 41 to 46 of the inverters 30 and 40.

At S402, the control unit 70 notifies the external control unit 105 of the information indicating that preparation for power reception is completed. Upon receiving the notification of completion of preparation for power reception, the external control unit 105 starts power supply. When power supply is started, at S403, in a state in which the voltage sources 21 and 22 are connected in series, the control unit 70 performs simultaneous charging of the voltage sources 21 and 22.

At S403m, when the switching elements are MOSFETs or the like, and capable of enabling energization from the low potential side to the high potential side through the switch units SW by being turned on, after confirmation of energization, the inverter control unit 71 turns on the first lower arm elements 34 to 36 and the second upper arm elements 41 to 43. In addition, if the elements 34 to 36 and 41 to 43 already are turned on, the on-state is maintained. Here, when the switching elements are IGBTs or the like, and incapable of enabling energization from the low potential side to the high potential side through the switch units SW, S403m is omitted.

At S404, in a manner similar to that at S305 in FIG. 9, the charging control unit 75 determines whether the states of charge of the voltage sources 21 and 22 have reached the target. When determined that the states of charge of the voltage sources 21 and 22 have not reached the target (NO at S404), the control unit 70 returns to S403 and continues serial charging of the voltage sources 21 and 22. When determined that the states of charge of the voltage sources 21 and 22 have reached the target (YES at S404), the control unit 70 proceeds to S405.

At S405, the control unit 70 transmits the power supply stop command to the external control unit 105. Upon receiving the power supply stop command, the control unit 105 stops power supply from the high-speed charger 100. At S406, the inverter control unit 71 turns off all elements 31 to 36 and 41 to 46 of the inverters 30 and 40. If all elements 31 to 36 and 41 to 46 already are turned off, the off-state is maintained.

As described above, the charging system 1 according to the present embodiment charges the first voltage source 21 and the second voltage source 22 through the high-speed charger 100. The first voltage source 21 and the second voltage source 22 are two voltage sources that supply electric power to the MG 10 that includes the coils 11 to 13 of a plurality of phases. The charging system 1 includes the first inverter 30, the second inverter 40, the high-potential-side switch 51, the low-potential-side switch 52, and the control unit 70.

The first inverter 30 includes the first switching elements 31 to 36. The first inverter 30 is connected to respective first ends 111, 121, and 131 of the coils 11 to 13, and the first voltage source 21. The second inverter 4 includes the second switching elements 41 to 46. The second inverter 40 is connected to respective second ends 112, 122, and 132 of the coils 11 to 13, and the second voltage source 22.

The high-potential-side switch 51 is provided on the high-potential-side power supply line 61 that connects the high-potential-side external connection terminal 6 and the high potential side of the first voltage source 21. The high-potential-side external connection terminal 6 can be connected to the high potential side of the high-speed charger 100. The low-potential-side external connection terminal 52 is provided on the low-potential-side power supply line 62 that connects the low-potential-side external connection terminal 7 and the second voltage source 22. The low-potential-side external connection terminal 7 can be connected to the low potential side of the high-speed charger 100. The control unit 70 controls the on/off switching of the first switching elements 31 to 36 and the second switching elements 41 to 46.

According to the present embodiment, in the dual-power-supply dual-inverter configuration in which the inverters 30 and 40 and the voltage sources 21 and 22 are provided on both sides of the coils 11 to 13 that are open-end windings, the two voltage sources 21 and 22 that are insulated from each other can be simultaneously charged as a result of the high-potential-side power supply line 61 and the low-potential-side power supply line 62 being provided, and the inverters 30 and 40 and the coils 11 to 13 being used as power paths. In addition, through control of the inverters 30 and 40 and the switches 51 and 52, charging can be switched among individual charging, parallel charging, and serial charging of the voltage sources 21 and 22. In particular, in cases in which the MG 10 and the inverters 30 and 40 are designed for large output, the configuration is applicable to high-speed charging in which the supplied power is large.

Each of the switching elements 31 to 36 and 41 to 46 includes the switch unit SW and the freewheeling diode FD. The switch unit SW is capable of switching between conducting and blocking a current based on a command from the control unit 70. The freewheeling diode FD allows a current to be circulated from the low potential side to the high potential side through the freewheeling diode FD. The first switching element 31 to 36 include the first upper arm elements 31 to 33 that are connected to the high potential side and the first lower arm elements 34 to 36 that are connected to the low potential side of the first upper arm elements 31 to 33.

In a state in which the high-potential-side switch 51 and the low-potential-side switch 52 are closed, the control unit 70 turns on at least the first upper arm element 31, 32, or 33 of one phase, and turns on at least the second lower arm element 44, 45, or 46 of one phase that differs from the phase of which the first upper arm element 31, 32, or 33 is turned on. The control unit 70 thereby performs parallel charging of the first voltage source 21 and the second voltage source 22. Consequently, parallel charging of the voltage sources 21 and 22 can be performed. Charging can be appropriately performed by the high-speed charger 100 of which the voltage specification is a voltage that is lower than the sum of the rated voltages of the voltage sources 21 and 22.

After the start of charging, the control unit 70 turns on the second upper arm element 41, 42, or 43 of the phase that is the same as the phase of which the first upper arm element 31, 32, or 33 is turned on, and turns on the first lower arm element 34, 35, or 36 of the phase that is the same as the phase of which the second lower arm element 44, 45, or 46 is turned on. Consequently, when the switching element is an element that is capable of enabling energization from the low potential side to the high potential side, such as a MOSFET, conduction loss can be reduced and charging time can be shortened.

In a state in which the high-potential-side switch 51 and the low-potential-side switch 52 are closed, the control unit 70 turns off the first switching elements 31 to 35 and the second switching elements 41 to 46. The control unit 70 thereby performs serial charging of the first voltage source 21 and the second voltage source 22. Consequently, serial charging of the voltage sources 21 and 22 can be performed. Charging can be performed with high efficiency by the high-speed charger 100 of which the voltage specification is a voltage that is higher than the sum of the rated voltages of the voltage sources 21 and 22.

After the start of charging, the control unit 70 turns on the first lower arm elements 34 to 36 of all phases and the second upper arm elements 41 to 43 of all phases. Consequently, when the switching element is an element that is capable of enabling energization from the low potential side to the high potential side, such as a MOSFET, In a state in which the high-potential-side switch 51 and the low-potential-side switch 52 are closed, the control unit 70 turns on at least the second lower arm element 44, 45, or 46 of one phase. The control unit 70 thereby performs individual charging of the first voltage source 21. In addition, in a state in which the high-potential-side switch 51 and the low-potential-side switch 52 are closed, the control unit 70 turns on the first upper arm element 31, 32, or 33 of at least one phase. The control unit 70 thereby performs individual charging of the second voltage source 22. Consequently, because individual charging of the voltage sources 21 and 22 can be performed, the voltage sources 21 and 22 can be appropriately charged.

The control unit 70 is capable of switching between individual charging of the first voltage source 21 or the second voltage source 22, and dual-side simultaneous charging (parallel charging and serial charging) of the first voltage source 21 and the second voltage source 22, based on the states of charge of the first voltage source 21 and the second voltage source 22. Consequently, the voltage sources 21 and 22 can be appropriately charged.

According to the present embodiment, the MG 10 corresponds to a "rotating electric machine". The freewheeling diodes FD of the switching elements 31 to 36 and 41 to 46 correspond to a "circulating unit". The high-speed charger 100 corresponds to an "external charger".

Other Embodiments

The rotating electric machine according to the above-described embodiment has three phases. According to another embodiment, the rotating electric machine may have four or more phases. According to the above-described embodiment, the rotating electric machine is used as the main machine motor of an electric vehicle. According to another embodiment, the rotating electric machine is not limited to the main machine motor. For example, the rotating electric machine may be a so-called integrated starter generator (ISG) that provides functions as both a starter and a generator, or an auxiliary motor. In addition, the power supply system may be applied to an apparatus other than a vehicle. The present disclosure is not limited in any way by the above-described embodiments. Various embodiments are possible without departing from the spirit of the disclosure.

What is claimed is:

1. A charging system that charges a first voltage source and a second voltage source through an external charger, the first voltage source and the second voltage source being two voltage sources that supply electric power to a rotating electric machine that includes multiphase coils, the charging system comprising:
    a first inverter that includes a plurality of first switching elements that correspond to the multiphase coils, and is connected to respective first ends of the coils and the first voltage source;
    a second inverter that includes a plurality of second switching elements that correspond to the multiphase coils, and is connected to respective second ends of the coils and the second voltage source;
    a first external connection terminal that is connected to a high potential side of the external charger;
    a first power supply line that connects the first external connection terminal and a high potential side of the first voltage source;
    a first switch that is provided on the first power supply line and between the first external connection terminal and a connection point between the high potential side of the first voltage source and the first power supply line;
    a second external connection terminal that is connected to a low potential side of the external charger;
    a second power supply line that connects the second external connection terminal and a low potential side of the second voltage source, not via a low potential side of the first voltage source;
    a second switch that is provided on the second power supply line; and
    a control unit that controls on/off switching of the plurality of first switching elements and the plurality of second switching elements.

2. The charging system according to claim 1, wherein:
    each of the plurality of first switching elements and the plurality of second switching elements has a switch unit that is capable of switching between conducting and blocking a current based on a command from the control unit, and a circulating unit that allows a current to be circulated from the low potential side to the high potential side through the circulating unit;
    the plurality of first switching elements include a first upper arm element that is connected to the high potential side of the first inverter, and a first lower arm element that is connected to the low potential side of the first inverter and the low potential side of the first upper arm element;
    the plurality of second switching elements include a second upper arm element that is connected to the high potential side of the second inverter, and a second lower arm element that is connected to the low potential side of the second inverter and the low potential side of the second upper arm element; and
    the control unit performs parallel charging of the first voltage source and the second voltage source by turning on the first upper arm element of at least one phase and turning on the second lower arm element of at least one phase that differs from the at least one phase of which the first upper arm element is turned on, in a state in which the first switch and the second switch are closed.

3. The charging system according to claim 2, wherein after charging is started, the control unit turns on the second upper arm element of a phase that is the same phase as the at least one phase of which the first upper arm element is turned on, and turns on the first lower arm element of a phase that is the same phase as the at least one phase of which the second lower arm element is turned on.

4. The charging system according to claim 3, wherein:
the control unit performs serial charging of the first voltage source and the second voltage source by turning off the plurality of first switching elements and the plurality of second switching elements, in a state in which the first switch and the second switch are closed.

5. The charging system according to claim 4, wherein:
after charging is started, the control unit turns on the first lower arm elements of all phases and the second upper arm elements of all phases.

6. The charging system according to claim 5, wherein:
the control unit
    performs individual charging of the first voltage source by turning on the second lower arm element of at least one phase in a state in which the first switch and the second switch are closed, and
    performs individual charging of the second voltage source by turning on the first upper arm element of at least one phase in a state in which the first switch and the second switch are closed.

7. The charging system according to claim 6, wherein:
the control unit performs control so as to be capable of switching between individual charging of the first voltage source or the second voltage source, and simultaneous charging of the first voltage source and the second voltage source, based on states of charge of the first voltage source and the second voltage source.

8. The charging system according to claim 2, wherein:
the control unit performs serial charging of the first voltage source and the second voltage source by turning off the plurality of first switching elements and the plurality of second switching elements, in a state in which the first switch and the second switch are closed.

9. The charging system according to claim 8, wherein:
after charging is started, the control unit turns on the first lower arm elements of all phases and the second upper arm elements of all phases.

10. The charging system according to claim 2, wherein:
the control unit
    performs individual charging of the first voltage source by turning on the second lower arm element of at least one phase, in a state in which the first switch and the second switch are closed, and
    performs individual charging of the second voltage source by turning on the first upper arm element of at least one phase, in a state in which the first switch and the second switch are closed.

11. The charging system according to claim 1, wherein:
the control unit performs control so as to be capable of switching between individual charging of the first voltage source or the second voltage source, and simultaneous charging of the first voltage source and the second voltage source, based on states of charge of the first voltage source and the second voltage source.

\* \* \* \* \*